United States Patent [19]

Bae et al.

[11] Patent Number: 5,459,176
[45] Date of Patent: Oct. 17, 1995

[54] RADIATION CURABLE COATING FOR PLASTIC ARTICLES

[75] Inventors: Young C. Bae, Pleasanton; Thomas B. Ottoboni, Belmont, both of Calif.

[73] Assignee: Soane Technologies, Inc., Hayward, Calif.

[21] Appl. No.: 173,834

[22] Filed: Dec. 23, 1993

[51] Int. Cl.$^6$ ............................................. C08F 2/46
[52] U.S. Cl. .................... 522/181; 523/106; 525/937; 427/508; 428/412
[58] Field of Search ............... 522/181; 523/106; 525/937; 427/508; 428/412

[56] References Cited

U.S. PATENT DOCUMENTS

| | | | |
|---|---|---|---|
| 4,954,591 | 9/1990 | Belmares | 522/183 |
| 4,987,230 | 1/1991 | Monroe | 546/94 |
| 5,246,728 | 9/1993 | Rodriguez | 427/595 |

*Primary Examiner*—Mark A. Chapman
*Attorney, Agent, or Firm*—Fish & Richardson

[57] ABSTRACT

Abrasion resistant, radiation curable compositions are provided for forming coatings over plastic substrates. Such compositions are particularly provided for forming an abrasion resistant, tintable coating over polycarbonate ophthalmic lenses. Generally, the radiation-curable coating comprises 10 to 50 parts of polyacryloylated alkane polyols containing up to about 20 carbon atoms and an average of at least three O-acryloyl groups; and 20 to 80 parts of polyacryloylated alkoxylated polyols containing up to about 20 carbon atoms and an average of at least three O-[acryloyl-(polyalkylene oxide)] chains, wherein each of the polyalkylene oxide chains comprises from one to 20 alkylene oxide groups.

25 Claims, No Drawings

5,459,176

RADIATION CURABLE COATING FOR PLASTIC ARTICLES

FIELD OF THE INVENTION

The present invention relates to radiation curable coating compositions for plastic articles, such as ophthalmic lenses. In particular, the present invention relates to abrasion resistant coating compositions which are useful for coating polycarbonate ophthalmic lenses.

BACKGROUND OF THE INVENTION

Ophthalmic lenses and sunglasses have traditionally been prepared using glass as the lens material, however, plastic lenses are becoming increasingly popular due to their lightness and better shatter resistance. However, plastics are softer than glass, and therefore are inferior to glass in scratch resistance. Generally, scratch resistance and impact resistance are difficult to obtain with the same plastic (polymeric) material, so usually outer layers or coatings have been used to impart scratch resistance to an impact resistant plastic lens. A commonly used material is allyldiglycol carbonate (for example, CR-39, sold by PPG Industries) which has a high impact resistance but has a lower abrasion resistance than glass. Bisphenol-A type polycarbonates are also used since they are about two hundred times more impact resistant than glass, but are very susceptible to abrasion. Therefore, virtually all plastic lens materials, in particular, polycarbonate materials, must be coated or otherwise protected against abrasion.

An additional problem is encountered in the preparation of prescription sunglasses using polycarbonate lenses. Typically, lenses are tinted by dipping into a water bath containing an appropriate dye maintained at a temperature between about 90° and 100° C. The amount of tinting is related to the time of immersion in the bath. Because polycarbonate lenses cannot be tinted in this manner, a tintable coating material must be used to absorb the tinting dye. However, many of the coatings utilized which impart abrasion or scratch resistance to plastic lenses have a low absorption of dye, therefore scratch resistance is achieved at the expense of tintability of the lens.

Another technical problem dealing with plastic materials is the curing of the coating which usually involves thermal curing or radiation curing, typically by ultraviolet radiation. Coatings which require thermal curing typically involve hours for a complete cure and therefore are undesirable from a manufacturing point of view. The ultraviolet curing systems are therefore preferred in that curing requires seconds, but have the drawback of being inhibited by the presence of oxygen. For example, in U.S. Pat. No. 5,246,728, a UV curing system is disclosed requiring a photoinitiator that counteracts the effect of oxygen inhibition.

It is therefore an object of the present invention to provide an abrasion resistant radiation curable coating for plastic materials which is tintable.

It is another object of the present invention to provide abrasion resistant, radiation curable coatings for plastic materials which can be cured in the presence of oxygen or modified to be cured in the absence of oxygen.

It is a further object of the present invention to provide an abrasion resistant radiation curable tintable coating for polycarbonate materials.

These and other objects will be apparent from the following description, the appended claims from the practice of the invention.

SUMMARY OF THE INVENTION

The present invention provides abrasion resistant, radiation curable, tintable, coating compositions for plastic articles wherein the coating is curable under vacuum or in inert atmosphere such as nitrogen, comprising:

I. Ten to fifty parts of polyacryloylated alkane polyols, wherein the alkane polyols contain up to about 20 carbon atoms and an average of at least three O-acryloyl groups;

II. Twenty to eighty parts of polyacrylated alkoxylated polyols, wherein the polyacrylated alkoxylated polyols contain up to about 20 carbon atoms and an average of at least three O-[acryloyl-(polyalkylene oxide)] chains; wherein each of the polyalkylene oxide chains comprise from one to twenty alkylene oxide groups;

The composition will also contain a photoinitiating amount of a photoinitiator, typically between one and about six parts. Viscosity modifiers, typically up to 500 parts may be added, as well as dyes, surfactants and adhesion promoters may also be included in the composition in small amounts.

All parts are by weight described herein.

The present invention also provides an abrasion-resistant, radiation curable coating compositions which can be cured in the presence of air comprising:

I. Twenty to forty parts of polyacryloylated alkane polyols, wherein the alkane polyols contain up to about twenty carbon atoms and an average at least three O-acryloyl groups;

II. Fifty to eighty parts of polyacrylated alkoxylated polyols, wherein the polyacrylated alkoxylated polyols contain up to about twenty carbon atoms and an average of at least three O-[acryloyl-(polyalkylene oxide)] chains; wherein each of the polyalkylene oxide chains comprise from one to twenty alkylene oxide groups; and III. Optionally, five to thirty parts of an acrylated material which promotes adhesion of the cured coating composition to the substrate.

This composition will also contain a photoinitiating amount of a photoinitiator, typically one to about six parts, as well as optional viscosity modifiers, dyes and surfactants.

DESCRIPTION OF THE PREFERRED EMBODIMENTS

The coating compositions according to the present invention are useful on plastic articles, particularly plastic ophthalmic lenses. The coating compositions according to the present invention are particularly advantageous when applied to polycarbonate lenses because it allows such lenses to be tinted using conventional tinting techniques developed for the polycarbonates.

The coating compositions according to the present invention may be applied to one or more of the surfaces of plastic material using conventional methods such as spin coating, flow coating, dip coating, spray coating and other methods well-known to those of ordinary skill in the ophthalmic lens coating art. A typical spin coating method of coating ophthalmic lenses is described, for example, in U.S. Pat. No. 5,246,728. A typical coating will have a thickness of one to fifteen microns and it is realized that the thickness applied by spin coating is correlated to the viscosity of the material and the rotational speed of the spinning process. For dip coating, the coating thickness is related to the viscosity of the material, thus the coating composition should be compatible with a variety of viscosity-modifying agents. The coating should impart no color (such as yellowness) to the article coated. Using conventional coating techniques the formulation should yield a smooth uniform coating. The uniformity is particularly important if the lens is to be tinted since significant variations in the thickness of the coating may result in a nonuniform tint.

After application of the coating, it is cured by exposure to radiation, such as radiation from a high energy ultraviolet light source, for several seconds. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about twenty and 500 watts per inch of the source length. The articles may be cured by placing them under a lamp for the desired period of time or by passing the articles in front of the lamp on a conveyor system. The lamp area may be blanketed with an inert atmosphere such as nitrogen for curing the compositions in the absence of air. Articles which are coated on both sides may have both sides cured simultaneously by using light sources on each side of the article.

The photoinitiated curing reactions of the compositions according to the present invention involve free-radical polymerization and therefore are subject to oxygen inhibition. Therefore, in one embodiment, the composition may be formulated to be cured in the presence of nitrogen or other inert gas or in a vacuum. Alternatively, the composition may be provided as described herein, and initiated with an initiator which counteracts the effects of oxygen on the curing process. Examples of such photoinitiators are Darocure 1173, Irgacure 184, and a 1:1 mixture of benzophenone, Irgacure 907 or Irgacure 500.

The coated article obtained by the radiation curing is sufficiently hard for most purposes and requires no further hardening. Articles coated with the compositions according to the present invention, particularly polycarbonate articles, may be tinted in a conventional tint bath using water-dispersed dye-stuffs which are commonly used in the ophthalmic industry.

The polyacryolated alkane polyols will contain up to twenty carbon atoms and have at least three O-acryloyloxy groups and have the following formula

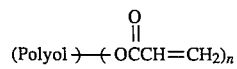

wherein n is greater or equal to four and the "polyol" portion is an alkane polyol having up to about twenty carbon atoms. It will be understood that the polyacryolated alkane polyols need not be, and typically are not, pure compounds, but rather are provided as a mixture of compounds wherein the alkane polyol has a plurality of alcohol groups, some of which may be acryolated and some of which may be free hydroxyl groups. Thus, the alkane polyols are described as containing an average number of O-acryloyl groups.

The alkane polyol refers to a polyhydroxy alkane wherein the alkane may be a straight, branched or cyclic alkane containing up to about twenty carbon atoms. Preferably, branched alkane polyols are utilized, such as tetra-(2-hydroxy-ethyl)-methane; 3, 4, 5, 6-tetra-(2-hydroxy-ethyl)-1-hydroxy-heptane, 2 -ethyl-2(hydroxymethyl)-1,3-propanediol, and the like.

As used herein it will also be understood that methacrylate can be substituted for an acrylate group and they are viewed as being equivalent to each other within the context of the present invention.

As used herein the term "alkylene oxide" is a divalent group comprising an alkyl chain bonded to an oxygen atom with open valences on the oxygen atom and on one of the carbon atoms in the alkyl chain. Hence, ethylene oxide is —$CH_2$—$CH_2$—O, propylene oxide is —$CH(CH_3)$—$CH_2$—O—, etc.

Examples of the polyacrylated alkane polyols having up to twenty carbon atoms and at least three acryloxy groups are Sartomer 9041 (a pentaacrylate ester), Sartomer 295 (a pentaerythritol tetraacrylate), Sartomer 399 (a dipentaerythritol pentaacrylate) and Radcure TMPTA (trimethylolpropane triacrylate).

An polyacrylated alkoxylated polyol containing up to twenty carbon atoms and an average of at least three O-[acryloyl-(polyalkylene oxide)] chains is a compound the following formula

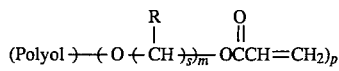

wherein p is greater or equal to three, each m is independently an integer from one to twenty, s is from one to six, and each R is independently H or lower alkyl, preferably methyl. In compositions wherein the polyalkylene oxide chains comprise from four to six alkylene oxide groups, then each m is independently an integer from four to six. Preferably the alkylene oxide groups are ethylene oxide or propylene oxide, i.e. wherein compounds wherein s is two, and both R groups are H or one R group is H and the other R group is methyl. Examples of such compounds include Sartomer 454 (ethoxylated TMPTA), Sartomer 502 (a highly ethoxylated TMPTA), Sartomer 494 (ethoxylated pentaerythritol tetraacrylate) and Sartomer 9035 (a highly alkoxylated triacrylate). An example of a compound wherein the polyalkylene oxide group contains from four to six alkylene oxide groups is Sartomer 499 (ethoxylated TMPTA).

As indicated above, each of the formulations, whether intended for curing in the presence of oxygen or in the absence of oxygen, will contain a photoinitiating amount of a photoinitiator, usually in a proportion of one to six parts. Examples of such photoinitiators are Darocure 1173 (2-hydroxy-2 -methyl-1-phenylpropan-1-one, Irgacure 184, 907 (2 -methyl-1-[4-(methylthio)phenyl]-2-morpholino-propanone-1) or 500 (1-hydroxycyclohexylphenyl ketone: benzophenone, 1:1 mixture).

The composition for curing in air may also comprise from five to thirty parts of an acrylated material which will promote adhesion of the cured material to the substrate such as tetrahydrofurfuryl acrylate (Sartomer 285) or a 1, 6-hexane diol diacrylate monomer (such as 1, 6-HDODA Radcure).

Finally, the formulations may contain viscosity modifiers, such as alcohols (typically n-propanol and/or n-butanol) or acrylate esters, dyes or surfactants (such as surfactant FC430, sold by 3M). In a preferred embodiment, dye will be a component of the coating formulation.

The following examples are provided by way of illustration and are not intended to limit the invention in any way.

EXAMPLE 1

General procedure for coating and curing

A coating composition according to the invention was spin coated onto clean three inch polycarbonate disks or polycarbonate lenses. The coatings were applied to the articles from a syringe while the article was rotating at 30 RPM. The excess material was spun off during a second cycle where the article was rotated at 3000 RPM for 45 seconds. The coated articles were placed under and American UV products lamp to cure. The lamp is a six inch medium pressure mercury vapor tube lamp and the coated article is placed two inches away from the lamp housing. Articles to be cured in a nitrogen atmosphere are placed in a Teflon container covered with a quartz window. The sealed container is purged with nitrogen and placed under the UV lamp. All coatings were cured for 15 seconds. For lenses to be coated on both sides the process was conducted separately each side.

EXAMPLE 2

Testing of the coated articles.

Coated articles were tested for percentage haze gain after abrasion with steel wool, adhesion of the coating, tintability, and optionally Bayer abrasion.

Steel wool testing was typically performed on a three in. diameter by 1/8" thick polycarbonate disk. The optical transmission of a flat article is first determined. This may be accomplished by reading the transmission on a spectrophotometer set to 550 nm. Alternately, a He—Ne laser with a lens train is used to generate a one cm diameter spot on the flat article. The transmitted light is focused down to a spot and measured by a photomultiplier. The signal is compared to the laser light and the drop in intensity is determined. The article is then attached to a platform that can oscillate at 100 cycles per minute with an amplitude of two inches. A one inch square of 000 steel wool is placed on the article and five pounds pressure is applied. The platform is oscillated for two minutes. The optical transmission again determined. The haze gain is expressed as the percentage decrease in optical transmission from the initial transmission.

For Bayer testing, the flat disk or plano lens is held tightly underneath a tray using clamps. A reference piece of CR-39 polycarbonate of the same diameter and shape is also attached underneath the tray. Two holes are present on the bottom of the tray, one above each sample. The tray is then filled with a known weight of coarse sand. The entire assembly is oscillated at 100 cycles per minute with an amplitude of 2.5 in for two minutes. The samples are removed and the haze gain is determined using the method described for the steel wool testing. Results are reported relative to uncoated CR-39 which is assigned a value of 1.0.

Adhesion of the coating was evaluated by scoring a crosshatch with a razor through the coating. Scotch tape was applied to the surface covering the crosshatch. The tape was quickly peeled off with one swift motion. This was repeated three times. If no coating was removed by the test the adhesion was deemed to be acceptable.

Tinting of the coating was conducted using standard techniques for the tinting of CR-39 ophthalmic lenses. The polycarbonate articles coated on only one side are dipped in a dye bath (i.e. gray dye (BPI) diluted in water) maintained at 95° C. for three minutes. Under these conditions it was determined that polycarbonate disks or lenses could not be tinted. Tintability was determined to be the reduction in transmission at 550 nm of the tinted coating as a percentage of initial transmission.

EXAMPLES 3–13

Various tintable, abrasion-resistant coatings were prepared and tested for abrasion (steel wool and Bayer test), adhesion and tintability. The parts of each component are in grams. Formulations were prepared by combining appropriate amounts of each material and mixing with a magnetic stirrer. The results are shown in Table 1. Formulations 5 and 6 are preferred for a process conducted in air and Formulation 12 is preferred for a process conducted under nitrogen atmosphere.

TABLE 1

|   | Example # | 3 | 4 | 5 | 6 | 7 | 8 | 9 | 10 | 11 | 12 | 13 |
|---|---|---|---|---|---|---|---|---|---|---|---|---|
| I | Pentaacrylate ester (Sartomer 9041) | 30 | 30 | 30 | 40 | 30 | 20 | 30 | 20 | 30 | 35 | 45 |
| II | Ethoxylated TMPTA (Sartomer 499) | 50 | 30 |   |   |   | 20 |   | 20 |   |   |   |
| II | Ethoxylated Pentaerythritol tetra-acrylate (Sartomer 494) | 10 | 30 | 30 |   | 30 |   |   |   |   |   |   |
| II | Highly ethoxylated TMPTA (Sartomer 502) |   |   | 30 | 60 | 30 | 60 | 60 | 60 | 70 | 65 |   |
| III | Tetrahydrofurfuryl acrylate (Sartomer 285) | 10 | 10 | 10 |   | 10 |   | 10 |   |   |   |   |
| II | High M.W. Ethoylated TMPTA Photomer 4158 (Henkel) |   |   |   |   |   |   |   |   |   |   | 55 |
| i | Irgacure 500 (Ciba Geigy) | 5 | 5 | 5 | 5 |   | 5 | 5 |   |   |   | 1 |
| i | Irgacure 907 (Ciba Geigy) |   |   |   |   | 5 |   |   |   |   |   |   |
| i | Darocure 1173 (Ciba Geigy) |   |   |   |   |   |   |   | 5 | 5 | 5 |   |
| s | FC-430 |   |   | 0.25 |   | 0.25 |   |   |   |   |   |   |
|   | Curing Time (seconds) | 15 | 15 | 15 | 15 | 15 | 15 | 15 | 15 | 15 | 15 | 15 |
|   | Curing atmosphere | air | air | air | air | air | air | air | nitrogen | nitrogen | nitrogen | nitrogen |
|   | Steel Wool Test | 0.6 | 0.5 | 0.4 | 0.3 | 0.3 | 1.1 | 0.8–1.0 | 0.6–0.8 | 0.3–0.6 | <0.3 | 0 |
|   | Adhesion Test | Good | Good | Good | Good | Good | Good | Good | Good | Good | Good |   |
|   | Bayer Test | 1.3–1.4 | 1.4–1.5 | 1.2–1.3 |   |   |   |   |   |   |   |   |
|   | Tintability | 18% | 14% | 17% | 18% | 18% | 39% | 30% | 40% | 35% | 25% | 19.5% |

TABLE 1-continued

| Example # | 3 | 4 | 5 | 6 | 7 | 8 | 9 | 10 | 11 | 12 | 13 |
| --- | --- | --- | --- | --- | --- | --- | --- | --- | --- | --- | --- |

I = O-acryloyl alkane polyol
II = O-[acryloyl-(polyalkyleneoxide)]alkane polyol
III = Adhesion promoter
i = photoinitiator
s = surfactant

What is claimed is:

1. An abrasion resistant, radiation curable coating composition for a plastic substrate comprising:

I: Ten to fifty parts of polyacryloylated alkane polyols, said alkane polyols containing free hydroxyl groups and up to about twenty carbon atoms and an average of at least three O-acryloyl groups; and II: Twenty to eighty parts of alkane polyols, said polyloyacrylated alkoxylated polyols containing up to about twenty carbon atoms and an average of at least three O-[acryloyl-(polyalkylene oxide)] chains; wherein each of said polyalkylene oxide chains comprises from one to twenty alkylene oxide groups.

2. An abrasion resistant, radiation curable coating composition for a plastic substrate comprising:

I: Twenty to forty parts of polyloyacrylated alkane polyols, said alkane polyols containing free hydroxyl groups and up to about twenty carbon atoms and an average of at least three O-acryloyl groups;

II: Fifty to eighty parts of alkane polyols, said polyloyacrylated alkoxylated polyols containing up to about twenty carbon atoms and an average of at least three O-[acryloyl-(polyalkylene oxide)] chains; wherein each of said polyalkylene oxide chains comprise from one to twenty alkylene oxide groups; and III: Optionally, five to thirty parts of an acrylated material which promotes adhesion of the cured coating composition to said substrate.

3. A composition according to claim 1 or 2 further comprising a photoinitiating amount of a photoinitiator responsive to ultraviolet radiation.

4. A composition according to claim 1 or 2, wherein said alkane polyols in said component I contain three to five of said O-acryloyl groups.

5. A composition according to claim 1 or 2 wherein in said component II said alkylene oxide comprises ethylene oxide or propylene oxide.

6. A composition according to claim 1 or 2 comprising a dye.

7. A composition according to claim 1 or 2 wherein component I is a compound or mixture of compounds of the formula

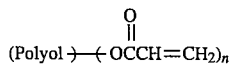

wherein n represents an average number greater or equal to 3.

8. A composition according to claim 1 or 2 wherein said polyol in component II is a compound or mixture of compounds the formula

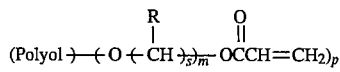

wherein p represents an average number greater or equal to three; each m is independently an integer from one to twenty; s is from one to six, and each R group is independently H or lower alkyl.

9. A composition according to claim 8 wherein s is two.

10. A composition according to claim 9 wherein both R groups are H.

11. A composition according to claim 9 wherein one R group is H and the other is methyl.

12. A composition according to claim 2 wherein said acrylated material which promotes adhesion comprises tetrahydrofurfuryl acrylate.

13. An ophthalmic lens comprising an optically clear plastic substrate and an optically clear, abrasion-resistant coating on at least one surface thereof formed by radiation curing a film comprising:

I. Ten to fifty parts of polyacryloylated alkane polyols, said alkane polyols containing free hydroxyl groups and up to about twenty carbon atoms and an average of at least three O-acryloyl groups; and II. Twenty to eighty parts of polyacryloylated alkoxylated polyols, said polyacryloylated alkoxylated polyols containing up to about twenty carbon atoms and an average of at least three O-[acryloyl-(polyalkylene oxide)] chains; wherein each of said polyalkylene oxide chains comprises from one to twenty alkylene oxide groups.

14. An ophthalmic lens comprising an optically clear plastic substrate and an optically clear, abrasion-resistant coating on at least one surface thereof formed by radiation curing a film comprising:

I: Twenty to forty parts of polyacryloylated alkane polyols, said alkane polyols containing free hydroxyl groups and up to about twenty carbon atoms and an average of at least three O-acryloyl groups;

II: Fifty to eighty parts of polyacryloylated alkoxylated polyols, said polyacryloylated alkoxylated polyols containing up to about twenty carbon atoms and an average of at least three O-[acryloyl-(polyalkylene oxide)] chains; wherein each of said polyalkylene oxide)] chains; wherein each of said polyalkylene oxide chains comprises from one to twenty alkylene oxide groups; and III: Optionally, five to thirty parts of an acrylated material which promotes adhesion of the cured coating composition to said substrate.

15. A lens according to claim 13 or 14 further comprising a photoinitiating amount of a photoinitiator responsive to ultraviolet radiation.

16. A lens according to claim 13 or 14 wherein said substrate comprises a polycarbonate.

17. A lens according to claim 13 or 14, wherein said alkane polyols in said component I contain three to five of said O-acryloyl groups.

18. A lens according to claim 13 or 14 wherein in said component II said alkylene oxide comprises ethylene oxide or propylene oxide.

19. A lens according to claim 13 or 14 comprising a dye.

20. A lens according to claim 13 or 14 wherein component I is a compound or mixture of compounds of the formula

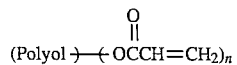

wherein n represents an average number greater or equal to 3.

21. A lens according to claim 17 or 18 wherein said polyol in component II is a compound or mixture of compounds of the formula

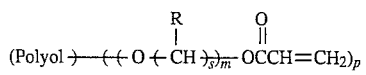

wherein p represents an average number greater or equal to three, each m is independently an integer from one to twenty; s is from one to six, and each R is independently H or lower alkyl.

22. A lens according to claim 21 wherein s is two.

23. A lens according to claim 22 wherein both R groups are H.

24. A lens according to claim 22 wherein one R group is H and the other is methyl.

25. A lens according to claim 14 wherein said acrylated material which promotes adhesion comprises tetrahydrofurfuryl acrylate.

* * * * *

UNITED STATES PATENT AND TRADEMARK OFFICE
CERTIFICATE OF CORRECTION

PATENT NO. : 5,459,176     Page 1 of 2

DATED : October 17, 1995

INVENTOR(S) : Young C. Bae and Thomas B. Ottoboni

It is certified that error appears in the above-identified patent and that said Letters Patent is hereby corrected as shown below:

Title Page: Attorney, Agent, or Firm —change "Fish & Richardson" to --Fish & Richardson P.C.--.

Column 2, line 14: change "polyacrylated" to --polyacryloylated--.

Column 2, line 15: change "polyacrylated" to --polyacryloylated--.

Column 2, line 34: change "polyacrylated" to --polyacryloylated--.

Column 2, line 35: change "polyacrylated" to --polyacryloylated--.

Column 4, line 21: change "polyacrylated" to --polyacryloylated--.

Column 4, line 23: after the word "compound", add --of--.

Column 5, line 10: change "and" to --an--.

Column 5, line 19: after the word "rately", add --on--.

Column 7, line 19: after the word "said", delete "poly".

Column 7, line 20: delete "loyacrylated" and insert --polyacryloylated--.

UNITED STATES PATENT AND TRADEMARK OFFICE
CERTIFICATE OF CORRECTION

PATENT NO. : 5,459,176

DATED : October 17, 1995

INVENTOR(S) : Young C. Bae and Thomas B. Ottoboni

It is certified that error appears in the above-identified patent and that said Letters Patent is hereby corrected as shown below:

Column 7, line 28: change "polyloyacrylated" to --polyacryloylated--.

Column 7, line 33: after the word "said", delete "polyloy".

Column 7, line 34: delete "acrylated" and insert --polyacryloylated--.

Column 7, line 67: after the word "pounds", add --in--.

Column 9, line 18: change "17 or 18" to --13 or 14--.

Signed and Sealed this

Eleventh Day of February, 1997

Attest:

BRUCE LEHMAN

Attesting Officer

Commissioner of Patents and Trademarks